US012758993B2

(12) United States Patent
Ying

(10) Patent No.: US 12,758,993 B2
(45) Date of Patent: Oct. 13, 2026

(54) FOAM POT

(71) Applicant: Shengchen Ying, Zhejiang (CN)

(72) Inventor: Shengchen Ying, Zhejiang (CN)

( * ) Notice: Subject to any disclaimer, the term of this patent is extended or adjusted under 35 U.S.C. 154(b) by 404 days.

(21) Appl. No.: 18/458,133

(22) Filed: Aug. 29, 2023

(65) Prior Publication Data

US 2025/0073728 A1 Mar. 6, 2025

(51) Int. Cl.
*B05B 7/00* (2006.01)
*B05B 7/24* (2006.01)

(52) U.S. Cl.
CPC .......... *B05B 7/0062* (2013.01); *B05B 7/2443* (2013.01)

(58) Field of Classification Search
CPC ... B05B 7/0062; B05B 7/0056; B05B 7/0018; B05B 7/005; B05B 7/0408; B05B 7/0425; B05B 7/2443
USPC ................................ 239/318, 343, 347, 348
See application file for complete search history.

(56) References Cited

U.S. PATENT DOCUMENTS

| | | | | |
|---|---|---|---|---|
| 11,813,634 B1 * | 11/2023 | Xie | B05B 7/0018 |
| 2017/0259281 A1 * | 9/2017 | Carpanese | B01F 23/235 |
| 2020/0290064 A1 * | 9/2020 | Jia | B05B 1/169 |
| 2023/0141018 A1 * | 5/2023 | Rowen | B05B 7/2443 239/310 |

* cited by examiner

*Primary Examiner* — Cody J Lieuwen
(74) *Attorney, Agent, or Firm* — Hawaii Patent Services; Nathaniel K. Fedde; Kenton N. Fedde

(57) ABSTRACT

The present invention provides a foam pot, comprising a foaming body, said Foaming body comprising a main fluid inlet and a main fluid outlet, a fluid channel being formed between the main fluid inlet and the main fluid outlet; a connector assembly is provided at the main fluid inlet; a foaming and nozzle device is provided at the main fluid outlet; a spray pot assembly and a foam concentration adjustment device for providing foaming liquid are also provided between the main fluid inlet and the main fluid outlet, said Foaming and nozzle device comprising a mixing tube provided on said Foaming body, said Mixing tube comprising an inlet end and an outlet end, a mixing channel being provided between the inlet end and the outlet end of said Mixing tube, one or more air inlets being provided at the inlet end, and a groove being provided on said Mixing tube.

14 Claims, 7 Drawing Sheets

FOAM POT

TECHNICAL FIELD

The present invention relates to the technical field of foam spraying devices, in particular to a foam pot.

BACKGROUND

A foam pot is a device that fills a prepared foam solution into the pot body and then attaches it to the high-pressure cleaning gun. By setting a foam ball on the foam pot and pressurizing it through the high-pressure cleaning machine, the foam solution flows through the foam ball to produce foam and then sprays out through the nozzle. Chinese Patent No. 213855168 discloses a foam nozzle, including a connecting joint body and a nozzle body, and an axial passage communicating with each other is provided inside the connecting joint body and the nozzle body; the nozzle body includes a front nozzle, a middle connecting passage, and a rear mixing chamber. A connecting head is provided at the front of the connecting joint body; the port of the mixing chamber at the rear of the nozzle body is screwed onto the external thread of the connecting head, and a mixing nozzle is provided at the front end of the connecting head. The outer diameter of the mixing nozzle is smaller than that of the connecting head. A first sealing ring is sleeved on the outer wall of the front end of the mixing nozzle; The first sealing ring plays a sealing effect between the mixing nozzle and the inner wall of the connecting passage; this utility model well solves the water leakage problem of existing foam pots and has good foaming effect.

However, this structure also has defects. Its foam ball is located inside the nozzle, and another end of the nozzle is connected with a clip. The clip bracket is sleeved on the outer circumference of the clip. The angle adjustment knob is also sleeved on the outer circumference of the foam inlet pipe, nozzle, clip bracket, and clip. The disadvantage of this structure is that when it is necessary to take out and replace the foam ball, it is necessary to disassemble both angle adjustment knob and nozzle; in addition, using only one nozzle increases material production for entire foam pot, increasing cost; when installing angle adjustment knob, it needs to be aligned with clip bracket for installation, which is inconvenient to operate.

Furthermore, pot lids connected to pot bodies are generally made by metal machining. To prevent corrosion, stainless steel or copper are generally used. Since these two metals are relatively expensive, this method is only suitable for small-sized pot lids or for household use. When commercial use requires large-sized foam pots, it is obviously not suitable to use metal processing to make large-sized pot lids.

Nowadays, there are also disclosures of foam pots that do not use separate nozzles. US Patent Publication No. US20200290064A1 discloses a multi-mode high-pressure foam gun in which its foam ball is set between foaming eccentric disk and air-mixing connection pipe. This multi-mode high-pressure foam gun also includes a nozzle-type turntable with vertical fan-shaped nozzles, horizontal fan-shaped nozzles, conical nozzles, down-pressing nozzles and linear nozzles on it. Therefore, it can provide multiple spraying modes but setting multiple spraying modes will increase manufacturing costs and failure rates. Not all users need multi-mode foam guns so it is necessary to design a simple structured foam pot to solve problems in existing technology.

SUMMARY

The present invention provides a foam pot, comprising:

A foaming body,

Said foaming body comprising a main fluid inlet and a main fluid outlet, a fluid channel being formed between said main fluid inlet and said main fluid outlet; a connector assembly is provided at said main fluid inlet; a foaming and nozzle device is provided at said main fluid outlet; a spray pot assembly and a foam concentration adjustment device for providing foaming liquid are also provided between said main fluid inlet and said main fluid outlet, said foaming and nozzle device comprising a mixing tube provided on said foaming body, said mixing tube comprising an inlet end and an outlet end, a mixing channel being provided between said inlet end and said outlet end of said mixing tube, one or more air inlets being provided at said inlet end, and a groove being provided on said mixing tube; a rotating sleeve is sleeved on said outlet end, said rotating sleeve comprising a foaming part having a cross-section smaller than said rotating sleeve body and provided at the front end, and a foaming ball is provided inside said foaming part; a card hole corresponding to the position of said groove is also provided on said rotating sleeve, and a card pin extending into said groove is provided inside said card hole; a clip bracket is sleeved on said foaming part, and a clip is provided inside said clip bracket; an angle adjustment knob for adjusting the opening and closing angle of said clip is sleeved on said rotating sleeve.

The present invention provides a foam pot, comprising:

A foaming body, said foaming body comprising a main fluid inlet and a main fluid outlet, a fluid channel being formed between said main fluid inlet and said main fluid outlet; a connector assembly is provided at said main fluid inlet; a foaming and nozzle device is provided at said main fluid outlet; an upper pot hopper assembly and a handle for providing foaming liquid are also provided between said main fluid inlet and said main fluid outlet, wherein, said foaming and nozzle device includes a mixing tube provided on said foaming body, said mixing tube comprising an inlet end and an outlet end, a mixing channel being provided between said inlet end and outlet end of said mixing tube, one or more air inlets being provided at said inlet end, and a groove being provided on said mixing tube; a rotating sleeve is sleeved on said outlet end, and said rotating sleeve comprises a foaming part having a cross-section smaller than said rotating sleeve body and provided at the front end, and a foaming ball is provided inside said foaming part; a card hole corresponding to the position of said groove is also provided on said rotating sleeve, and a card pin extending into said groove is provided inside said card hole; a clip bracket is sleeved on said foaming part, and a clip is provided inside said clip bracket; an angle adjustment knob for adjusting the opening and closing angle of said clip is sleeved on said rotating sleeve; when in use, said handle faces downward towards said foaming body; said upper pot hopper assembly faces upward towards said foaming body.

The present invention also provides a method for using a foam pot, comprising:

Providing a foam pot including a foaming body having a connector assembly, a foaming and nozzle device, a spray pot assembly and a foam concentration adjustment device thereon; said connector assembly includes a quick plug connector; said spray pot assembly includes a pot body and a pot lid; said Foam concentration adjustment device includes a fine-tuning knob; said foaming and nozzle device includes a rotating sleeve;

Pouring foaming liquid into said pot body;

Screwing said pot body onto said pot lid;

Connecting the foam pot to high-pressure water gun through said quick plug connector;

Adjusting foam concentration by rotating said fine-tuning knob;

Adjusting the foam style by rotating said rotating sleeve, and then start using.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

In the drawings.

Figure 1:
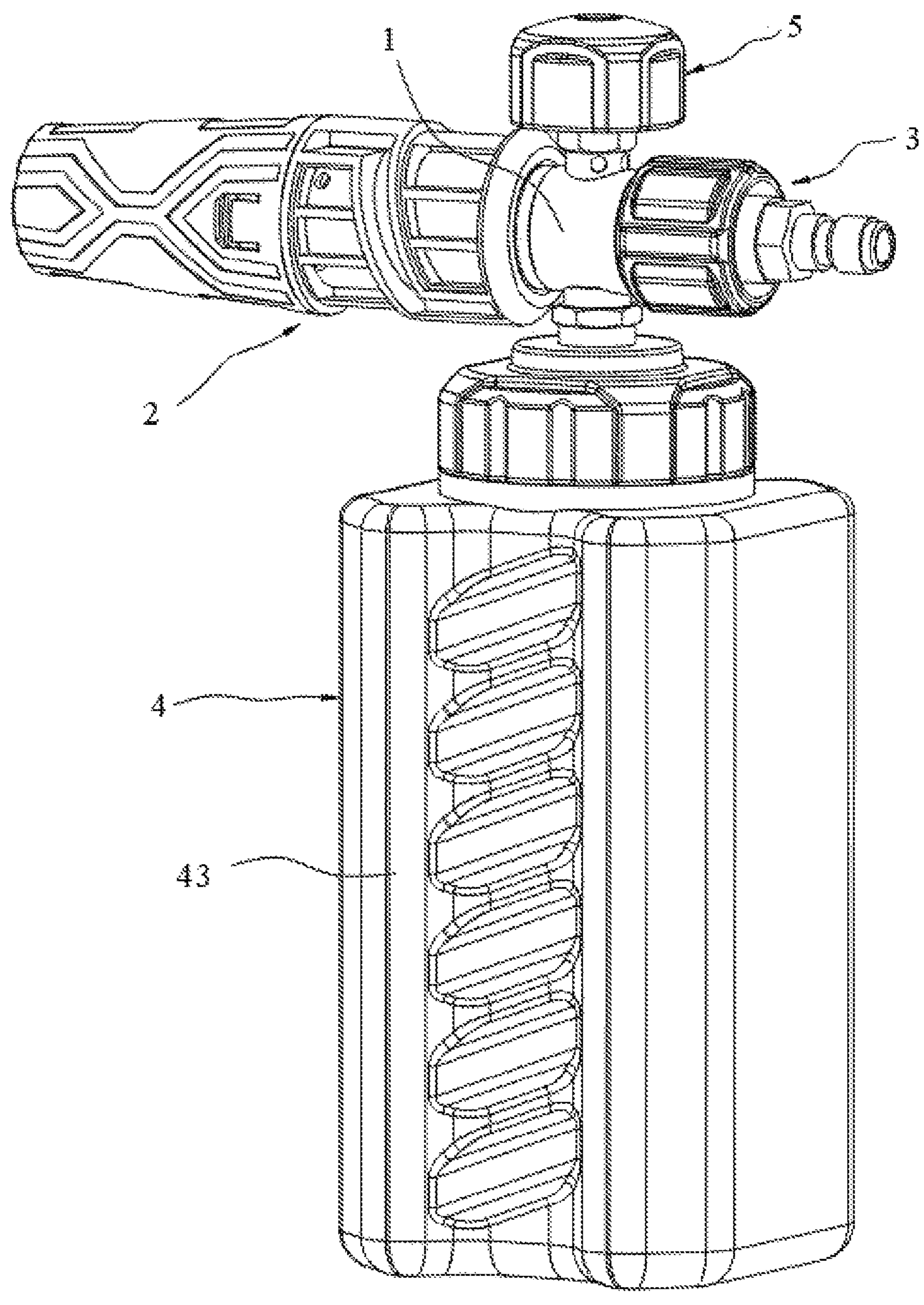
FIG. 1 is a schematic diagram of the overall structure of the present invention.

1, foaming body; 2, foaming and nozzle device; 3, connector assembly; 4, spray pot assembly; 5, foam concentration adjustment device; 6, upper pot hopper assembly; 7, handle; 20, mixing tube; 21, mixing channel; 22, air inlet; 23, groove; 24, rotating sleeve; 25, foaming ball; 26, card pin; 27, clip bracket; 28, clip; 30, spray core; 31, connector base; 31, flow stabilizing sleeve; 33, quick plug connector; 34, elastic cap; 40, connecting sleeve; 41, pot lid; 42, connecting pipe; 43, pot body; 50, adjusting seat body; 51, adjusting rod; 52, fine-tuning knob; 53, bolt; 60, connecting sleeve; 61, pot lid; 62, connecting pipe; 63, pot body; 64, top cover; 65, adjusting valve; 100, conical part; 201, first sealing ring groove; 202, second sealing ring groove; 210, conical hole; 240, card hole; 241, foaming part; 242, second card slot; 243, third sealing ring groove; 244, third sealing ring; 280, angle adjustment knob; 281, buckle; 291, first sealing ring; 292, second sealing ring; 311, flange; 320, water storage chamber; 401, protrusion; 421, first through hole; 422, second through hole; 600, liquid inlet; 650, valve seat; 651, flow limiting rod; 652, flow limiting knob; 2413, third card slot.

DESCRIPTION OF EMBODIMENTS

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

As shown in FIGS. 1 to 5, a foam pot includes a foaming body 1, which includes a main fluid input end and a main fluid output end. Generally, the input end and output end are defined by the direction of water flow. The end where water flows into said Foaming body 1 is the main fluid input end; the end where water flows out of said Foaming body 1 is the main fluid output end. A fluid channel is formed between the main fluid input end and the main fluid output end; a connector assembly 3 is provided at the main fluid input end; a foaming and nozzle device 2 is provided at the main fluid output end; between the main fluid input end and the main fluid output end, there is also provided a spray pot assembly 4 for providing foaming liquid and a foam concentration adjustment device 5 for adjusting foam concentration.

Figure 2:
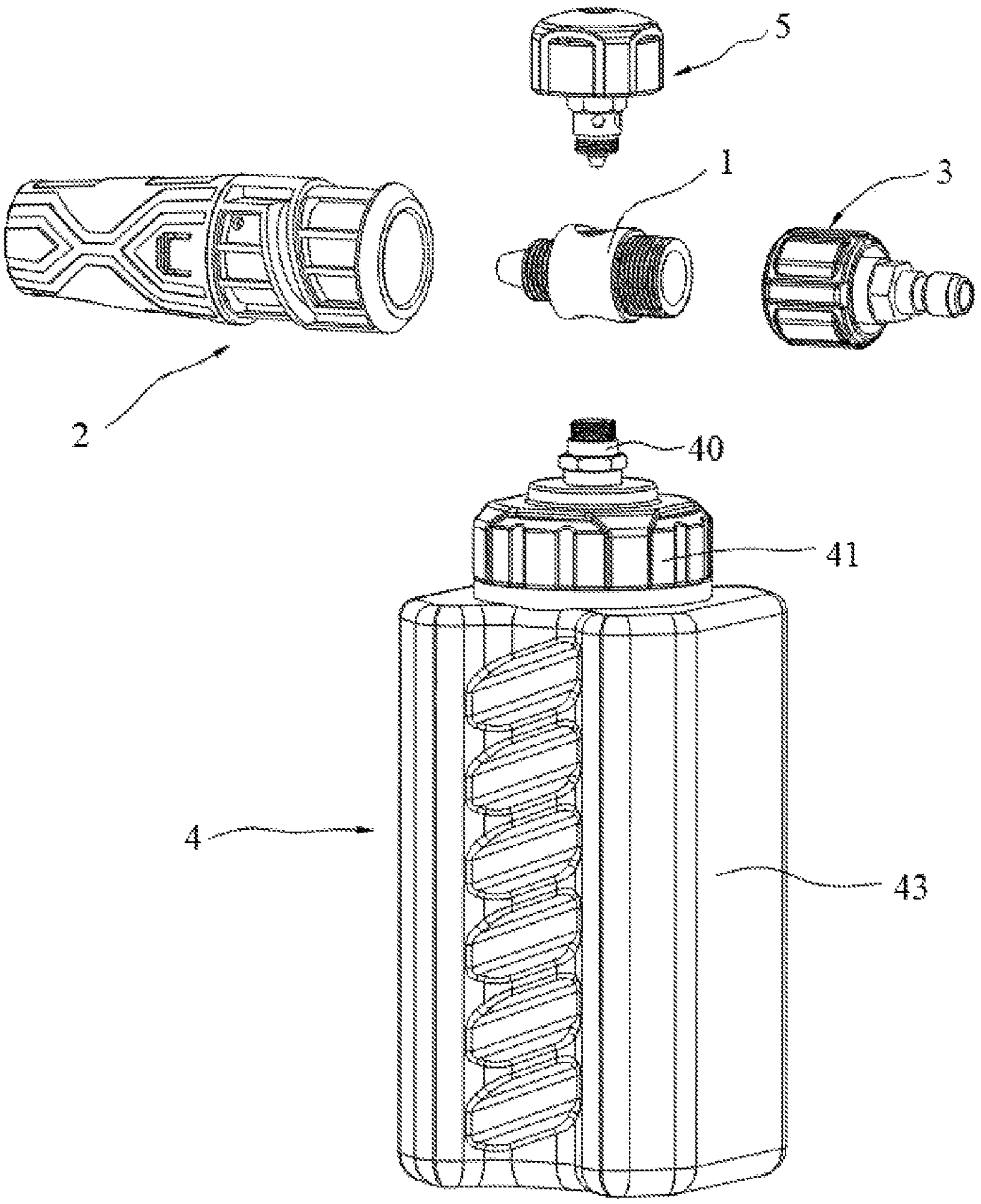
FIG. 2 is a partial exploded view of the present invention.
Figure 3:
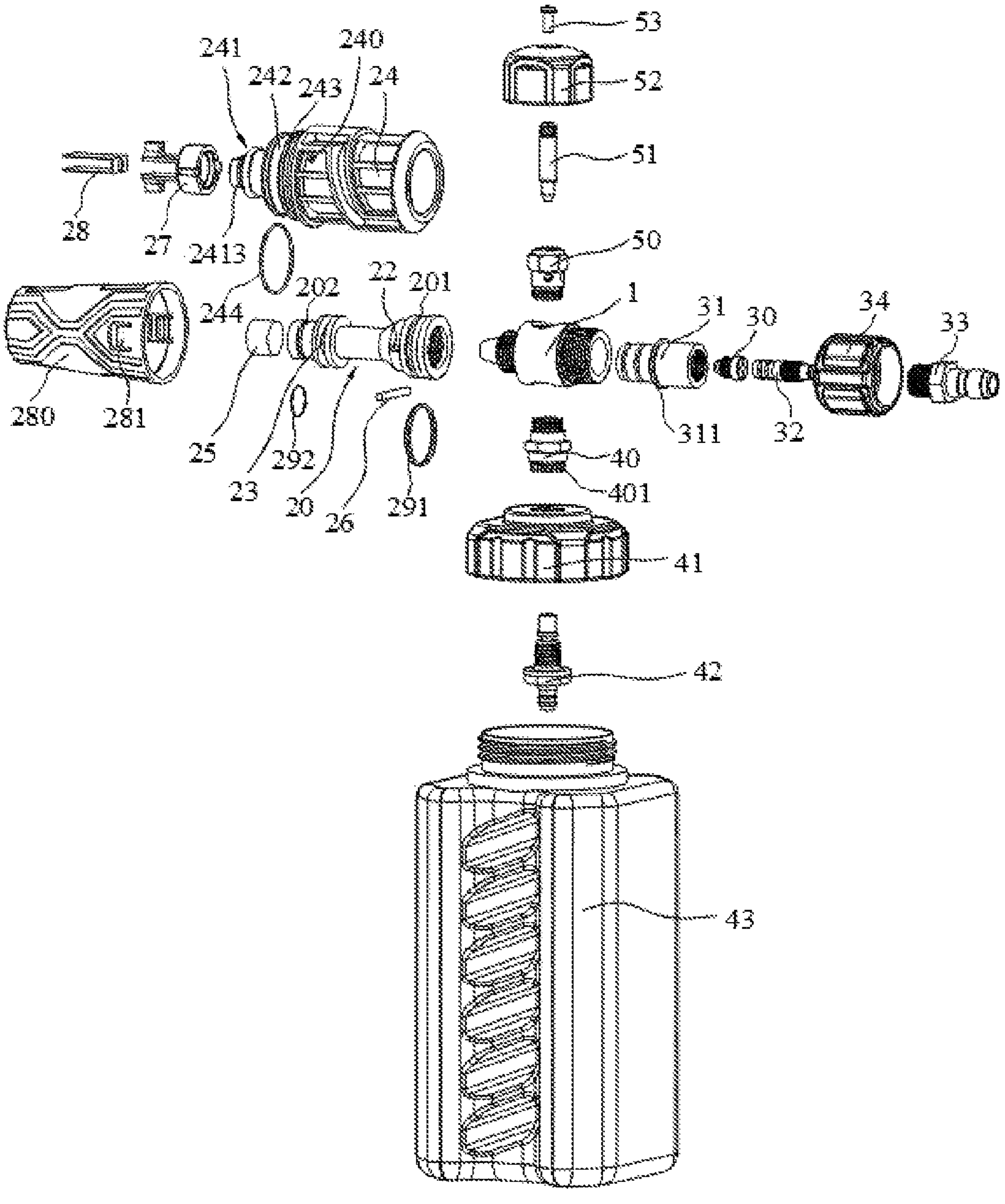
FIG. 3 is a complete exploded view of the present invention.
Figure 4:
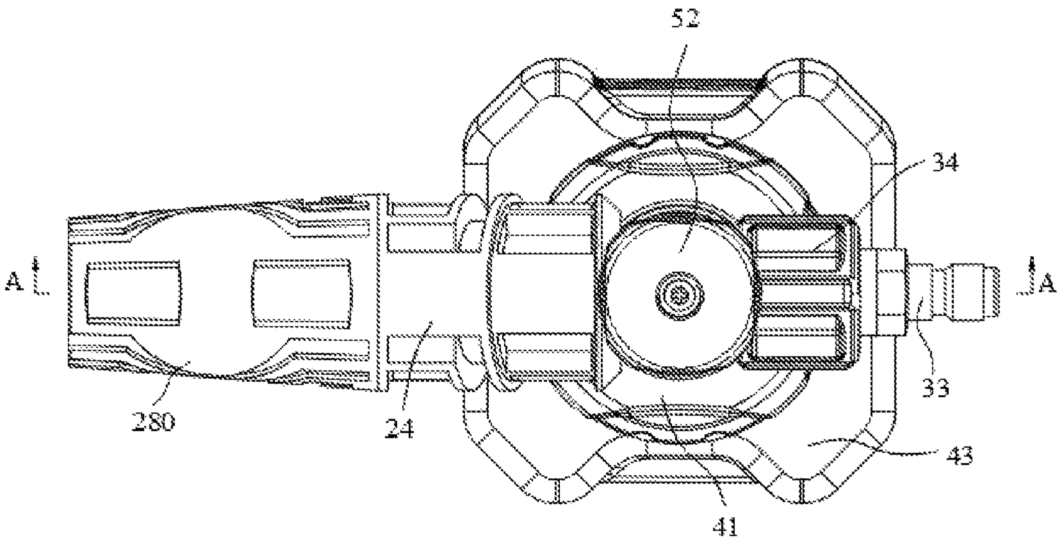
FIG. 4 is a top view of the present invention.

As shown in FIGS. 2 and 3, generally, said Foaming body 1 is configured as a four-way structure. The end which said Foaming and nozzle device 2 is located is defined as the front end; the end which said Connector assembly 3 is located is defined as the rear end; said Spray pot assembly 4 is provided at the lower end of said Foaming body 1; and said Foam concentration adjustment device 5 is provided at the upper end of said Foaming body 1. Of course, spray pot assembly 4 is not limited to being provided at the lower end of foaming body 1, it can be provided at any angle and any position on foaming body 1 between foaming and nozzle device 2 and connector assembly 3.

A conical part 100 extending outwardly and gradually decreasing in cross-section is provided at the main fluid output end of said foaming body 1. The provision of conical part 100 facilitates air entering into said foaming and nozzle device 2 to mix with water and foaming liquid. The above is a preferred structure. Of course, designing it into cylindrical or polygonal shapes can also achieve the above purpose. Said foaming and nozzle device 2 includes a mixing tube 20 provided on said foaming body 1.

Mixing tube 20 preferably connects to said foaming body 1 by internal thread and external thread. Of course, mixing tube 20's connection to foaming body 1 is not limited to thread connection. It can also be interference fit connection, with anti-detachment bolts or pins provided between mixing tube 20 and foaming body 1. Of course, it can also be any other desired structure that can tightly fix mixing tube 20 to foaming body 1.

Mixing tube 20 includes an inlet end and an outlet end. A mixing channel 21 is provided between the inlet end and outlet end of mixing tube 20. The cross-section of mixing channel 21 can be any shape. Generally, for ease of processing and better mixing effect, mixing channel 21 is preferably configured as a combination of conical and cylindrical structures. In this embodiment, the conical hole 210 of mixing channel 21 cooperates with the conical part 100 of foaming body 1, and the end of conical part 100 extends into conical hole 210. The outlet end of mixing tube 20 is bell-shaped to increase the area of mixed liquid spray.

One or more air inlets 22 are provided at the inlet end. In this embodiment, the number of air inlets 22 is four. Air inlet 22 is located within the conical surface range of conical part 100. There is a gap between conical part 100 and conical hole 210 of mixing channel 21. Gas passing through air inlet 22 can enter mixing channel 21 through the gap.

A rotating sleeve 24 is sleeved on the outlet end. Rotating sleeve 24 includes a foaming part 241 with a smaller cross-section than rotating sleeve body and located at the front end. A foaming ball 25 is provided inside foaming part 241. Foaming ball 25 is preferably provided inside foaming part 241 by clearance fit for easy removal for cleaning or replacement.

A groove 23 is provided on mixing tube 20; groove 23 can be one or more straight grooves. In this embodiment, groove 23 is preferably an annular groove so that card pin can be inserted into groove 23 in any position.

One or more card holes 240 corresponding to the position of groove 23 are provided on rotating sleeve 24. A card pin 26 extending into groove 23 is provided inside card hole 240. In this embodiment, card pin 26 is preferably a U-shaped card pin with an anti-detachment bending part. Before use, after sleeving rotating sleeve 24 on mixing tube 20, insert card pin 26 through card hole 240 into groove 23. When cleaning or replacing foaming ball 25 is needed, just pull-out card pin 26 and pull rotating sleeve 24 off mixing tube 20, tap rotating sleeve 24 or gently poke foaming ball 25 with a small rod from the front end of rotating sleeve 24 to remove foaming ball 25 from rotating sleeve 24. This scheme is very convenient for installing and removing foaming ball 25.

A clip bracket 27 is sleeved on foaming part 241, and a clip 28 is provided inside clip bracket 27. In this embodiment, an annular buckle is provided on clip bracket 27. When clip bracket 27 is sleeved on the front end of foaming part 241, the annular buckle snaps into third card slot 2413.

Of course, the connection between clip bracket 27 and foaming part 241 is not limited to buckle connection. Clip bracket 27 can also be connected to foaming part 241 by thread.

A first sealing ring groove 201 is provided on the outer circumference of the inlet end of mixing tube 20. A first sealing ring 291 is provided inside first sealing ring groove 201. First sealing ring 291 provides sealing for the connection between rotating sleeve 24 and mixing tube 20.

A second sealing ring groove 202 is provided on the outer circumference of the outlet end of mixing tube 20. A second sealing ring 292 is provided inside second sealing ring groove 202. Second sealing ring 292 provides sealing for the connection between foaming part 241 and mixing tube 20.

An angle adjustment knob 280 for adjusting the opening and closing angle of clip 28 is sleeved on rotating sleeve 24. A second card slot 242 and a third sealing ring groove 243 are provided at the front end of rotating sleeve 24; one or more buckles 281 are provided on angle adjustment knob 280. In this embodiment, the number of buckles 281 is two. Of course, the connection between angle adjustment knob 280 and rotating sleeve 24 is not limited to a snap connection, but may also be connected by a threaded connection.

When angle adjustment knob 280 is provided on rotating sleeve 24, buckle 281 snaps into second card slot 242; a third sealing ring 244 is provided inside third sealing ring groove 243, which provides sealing for the connection between angle adjustment knob 280 and rotating sleeve 24.

Figure 5:
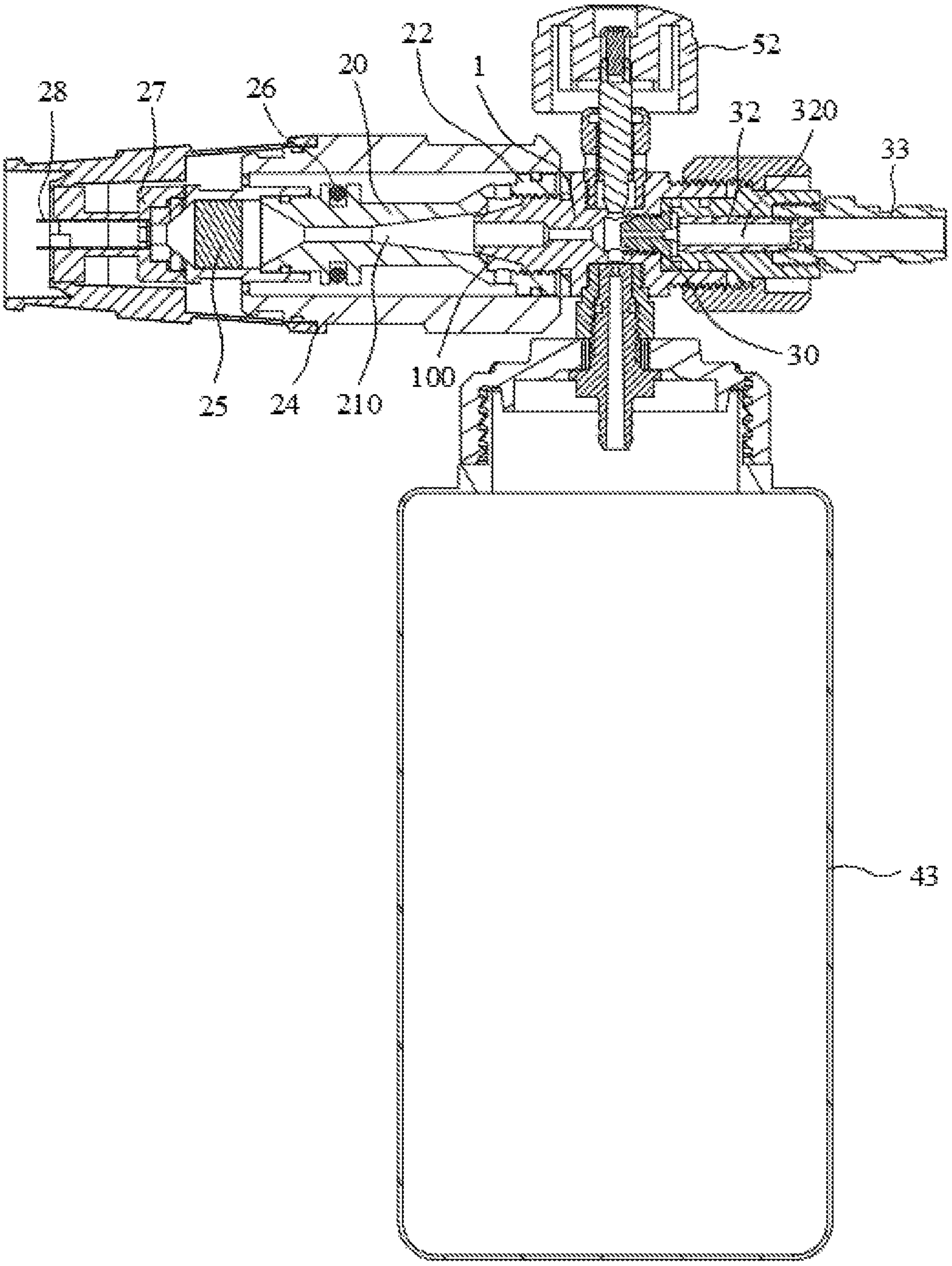
FIG. 5 is a sectional view taken along line A-A in FIG. 4.

As shown in FIGS. 3 and 5, spray pot assembly 4 includes a connecting sleeve 40 connected to foaming body 1. In this embodiment, connecting sleeve 40 is connected to foaming body 1 by external thread on connecting sleeve 40 and internal thread on foaming body 1. Of course, the connection between connecting sleeve 40 and foaming body 1 is not limited to thread connection. It can also be interference fit connection, with anti-detachment bolts or pins provided between connecting sleeve 40 and foaming body 1. Of course, it can also be any other desired structure that can tightly fix connecting sleeve 40 to foaming body 1.

A pot lid 41 is connected to the bottom end of connecting sleeve 40. In this embodiment, a gear-shaped protrusion 401 is provided at the bottom end of connecting sleeve 40 to prevent connecting sleeve 40 and pot lid 41 from rotating relative to each other. Protrusion 401 is not limited to gear shape and can be any cross-sectional shape that prevents connecting sleeve 40 and the pot lid 41 from rotating against each other.

As shown in FIGS. 3 and 5, the interior of the connecting sleeve 40 is also provided with a connecting pipe 42. The connecting pipe 42 passes through the pot lid 41 from the interior of the pot lid 41, clamping the pot lid 41 between the connecting sleeve 40 and the connecting pipe 42 to prevent leakage of the foaming liquid.

In this embodiment, the connecting pipe 42 is connected to the connecting sleeve 40 by threads. In fact, the connection between the connecting pipe 42 and the connecting sleeve 40 is not limited to threaded connections, but can also be an interference fit, and then a bolt or pin is provided between the connecting pipe 42 and the connecting sleeve 40 to prevent detachment; of course, it can also be any other desired structure that can tightly fix the connection between the connecting pipe 42 and the connecting sleeve 40.

The interior of the connecting pipe 42 is provided with coaxial and communicating first through hole 421 and second through hole 422. The first through hole 421 is close to said Foaming body 1, and the cross-sectional area of the first through hole 421 is smaller than that of the second through hole 422; The cross-sectional area of the second through hole 422 gradually increases from one end of the first through hole 421 to the other end of the connecting pipe 42.

In this embodiment, the first through hole 421 is a cylindrical through hole. With the above structure, the foaming liquid flowing from the second through hole 422 of the connecting pipe 42 to the first through hole 421 can be pressurized and sprayed into said Foaming body 1. Of course, the cross-sections of the first through hole 421 and the second through hole 422 are not limited to the above structure, and can also be various structures that can allow the foaming liquid to flow, such as circular or shaped holes with the same or different cross-sections.

As shown in FIG. 3, the pot body 43 is screwed onto the pot lid 41. To prevent leakage of the foaming liquid, a sealing gasket is provided between the pot lid 41 and the pot body 43; The pot body 43 can be any desired geometric shape that can meet the requirements of holding foaming liquid, has a beautiful appearance, is easy to pick up, and has anti-slip functions.

A suction pipe (not shown) is provided at the bottom of the connecting pipe 42, and the suction pipe extends to the bottom of the pot body 43. To prevent impurities from entering the connecting pipe 42, a filter screen can also be provided at the bottom of the suction pipe.

Said Connector assembly 3 includes a spray core 30 provided on said Foaming body 1. The spray core 30 is coaxially arranged with said Mixing tube 20. In this embodiment, the spray core 30 is connected to the internal thread on said Foaming body 1 by an external thread. Of course, the connection between the spray core 30 and said Foaming body 1 is not limited to threaded connections. A flange can also be provided at the end of the spray core 30. The gap between the spray core 30 body and said Foaming body 1 is matched, and it is clamped on said Foaming body by setting a flange.

As shown in FIGS. 3 and 5, said Connector assembly 3 also includes a connector base 31 provided at the main fluid input end. One end of the connector base 31 extends into said Foaming body 1, and the connector base 31 has a flange 311 that abuts against the end face of said Foaming body 1.

A flow stabilizing sleeve 32 is provided inside the connector base 31. The front end of the flow stabilizing sleeve 32 abuts against the spray core 30, and the flow stabilizing sleeve 32 is connected to the connector base 31 by threads. The inner hole cross-section of the flow stabilizing sleeve 32 near the spray core 30 is larger than the inner hole cross-section near the quick plug connector 33 to form a water storage chamber 320. With this setting, water entering from the quick plug connector 33 will first fill the water storage chamber 320 and then be sprayed out from the spray core 30. In this way, even if the water pressure is unstable and causes unstable water flow, it can ensure that the water sprayed out from the spray core 30 is constant, thereby improving the stability and continuity of spraying foam during work.

A quick plug connector 33 is provided at the tail end of the connector base 31; The quick plug connector 33 is connected to the connector base 31 by threads, and the quick plug connector 33 is a universal standard part that can achieve quick connection and disassembly with a car washer.

An elastic cap 34 is provided on said Foaming body 1 to tightly connect the connector base 31 to said Foaming body 1. The elastic cap 34 has an inner flange, and the elastic cap 34 presses against the connector base 31 through the flange. The elastic cap is connected to said Foaming body by threads. The elastic cap can be quickly disassembled to further achieve quick disassembly of the spray core.

As shown in FIGS. 3 and 5, said Foam concentration adjustment device 5 includes an adjusting seat body 50 provided on said Foaming body 1. The adjusting seat body 50 is connected to said Foaming body 1 by threads, and one or more vent holes are provided on the adjusting seat body 50. In this embodiment, the number of vent holes is four.

In fact, the connection between the adjusting seat body 50 and said Foaming body 1 is not limited to threaded connections, but can also be an interference fit, and then a bolt or pin is provided between the adjusting seat body 50 and said Foaming body 1 to prevent detachment; of course, it can also be any other desired structure that can tightly fix the connection between the adjusting seat body 50 and said Foaming body 1.

An adjusting rod 51 is provided inside the adjusting seat body 50, and the adjusting rod 51 is connected to the adjusting seat body 50 by threads. The end of the adjusting rod 51 near said Foaming body 1 is shaped into a cone, and the conical design has a guiding effect on the entry of the adjusting rod into said Foaming body.

A fine-tuning knob 52 is provided at the top of the adjusting rod 51. The fine-tuning knob is fixed to the top of the adjusting rod by a bolt. By rotating the fine-tuning knob, you can adjust the size of the fluid channel volume and the amount of air entering, thereby controlling the vacuum degree in the fluid channel, thereby controlling the amount of foam liquid sucked in, thereby achieving the effect of adjusting foam concentration.

As shown in FIG. 5, before work, fill in foaming liquid in pot body 43, connect this foam pot to car washer through quick plug connector 33. During work, water flows through quick plug connector 33, flow stabilizing sleeve 32 and spray core 30 into foaming body 1. Adjust foam concentration by adjusting fine-tuning knob. Get mixture of water and foaming liquid. Mixture sprays out from foaming body and enters mixing tube. Under negative pressure, air enters mixing tube from air inlet and continues to mix with mixture to form mixture of water, foaming liquid and air. Then mixture passes through trumpet-shaped outlet end and sprays onto foam ball to produce large amount of foam. Foam sprays out through clip. Angle adjustment knob can change width of clip to get foam flow shape needed by user.

In this scheme, when it is necessary to clean or replace the foam ball 25, you only need to pull out the card pin 26, pull the rotating sleeve 24 from said Mixing tube 20, and lightly tap the rotating sleeve 24 or use a small rod to lightly poke the foam ball 25 from the front end of the rotating sleeve 24. The foam ball 25 can be taken out from the rotating sleeve 24, and it is very convenient to install and disassemble the foam ball 25 in this scheme; this scheme eliminates the separate nozzle and reduces the cost of production and manufacturing; this scheme has a structure of spray pot assembly 4, using connecting pipe 42 and connecting sleeve 40 to clamp pot lid 41, which can adapt to commercial large-size foam pots, effectively reduce the use of metal, and save costs; this scheme has a simple structure, low failure rate, and is suitable for promotion and use.

The present invention provides another embodiment, that is, a second embodiment.

Figure 6:
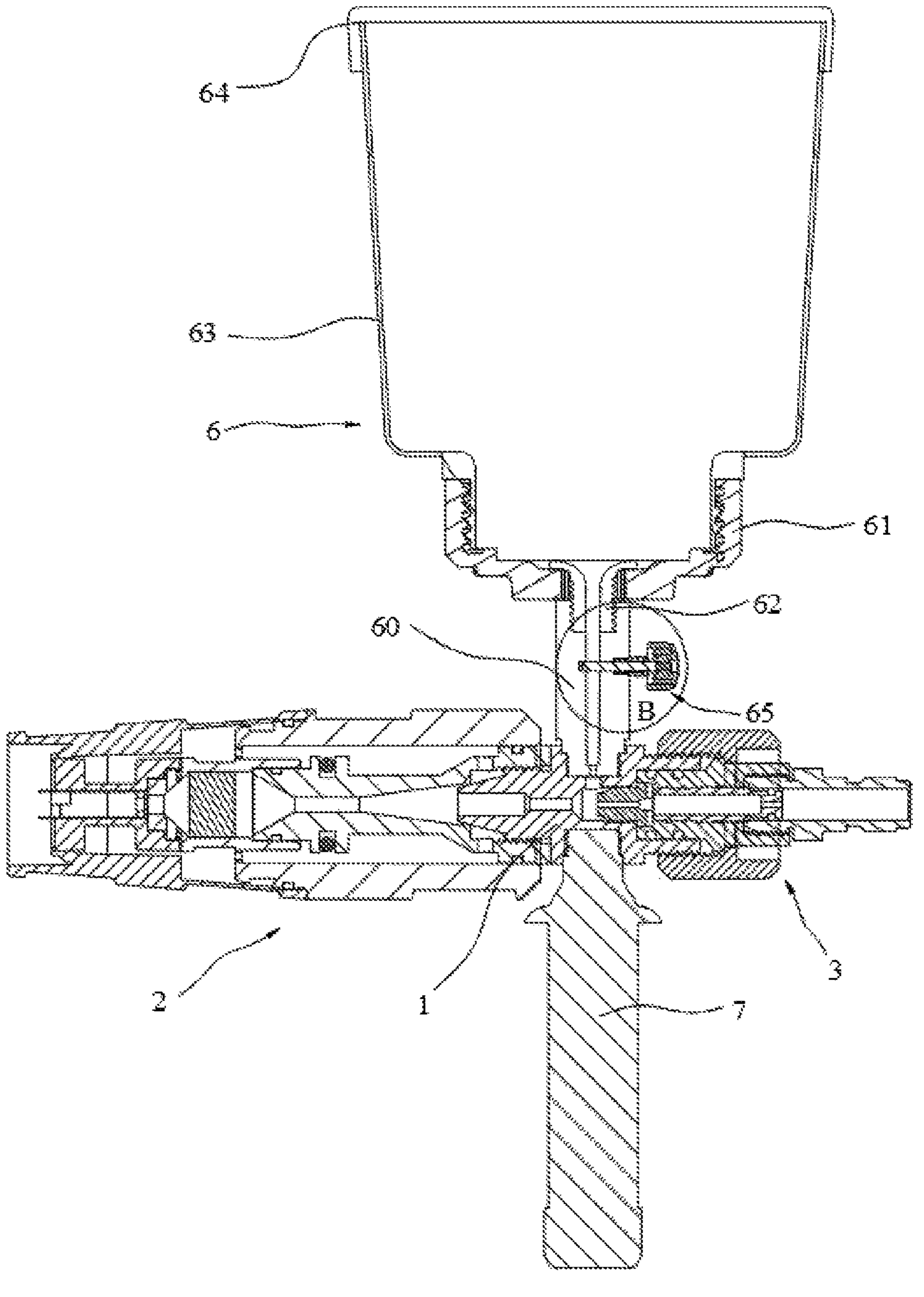
FIG. 6 is a schematic diagram of another embodiment of the present invention.
Figure 7:
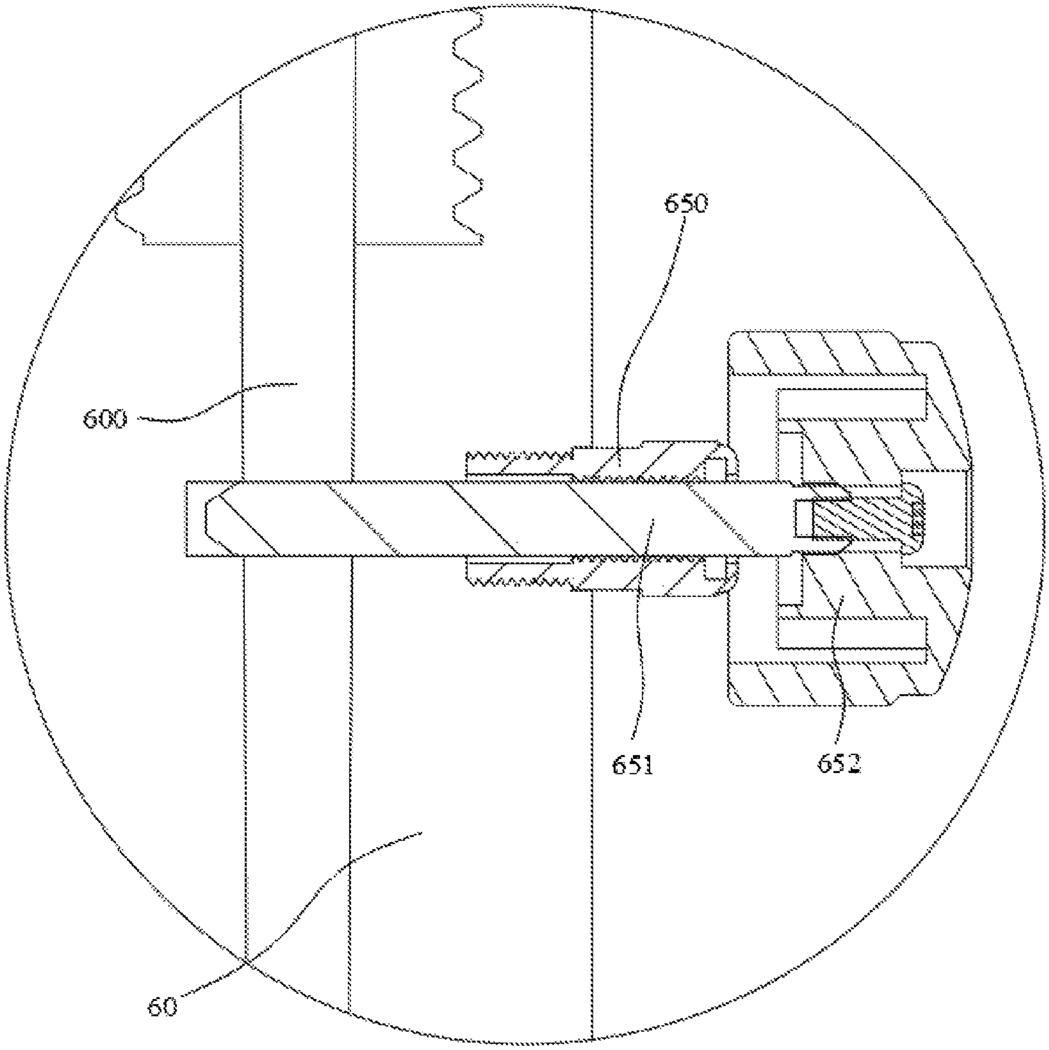
FIG. 7 is an enlarged view of point B in FIG. 6.

As shown in FIGS. 6 and 7, a foam pot includes a foaming body 1. Said Foaming body includes a main fluid input end and a main fluid output end. A fluid channel is formed between the main fluid input end and the main fluid output end. A connector assembly 3 is provided at the main fluid input end. A foaming and nozzle device 2 is provided at the main fluid output end. The structure and function of the above-mentioned foaming and nozzle device 2 and connector assembly 3 are consistent with those of the first embodiment, so their specific structures are not repeated here.

In this embodiment, said Foaming body 1 is also configured as a four-way structure. The end which said Foaming and nozzle device 2 is located is defined as the front end; The end which said Connector assembly 3 is located is defined as the rear end. The difference is that: between the main fluid input end and the main fluid output end, there are also an upper pot hopper assembly 6 for providing foaming liquid and a handle 7. When in use, handle 7 faces downward towards foaming body; upper pot hopper assembly faces upward towards foaming body.

Said Upper pot hopper assembly 6 includes a connecting sleeve 60 connected to said Foaming body 1, and a liquid inlet 600 is provided in the connecting sleeve 60. The connecting sleeve 60 is connected with a pot lid 61, and a connecting pipe 62 is also provided inside the connecting sleeve 60. The connecting pipe 62 passes through the pot lid 61 from the inside of the pot lid 61, clamping the pot lid 61 between the connecting sleeve 60 and the connecting pipe 62 to prevent leakage of the foaming liquid; the pot lid is screwed with a pot body 63; in this embodiment, the pot lid 61 and the pot body 63 can be integrally formed, and a top cover 64 is provided on the top of the pot body 63. The top cover 64 is connected to the pot body 63 by threads. Of course, the top cover 64 and the pot body 63 can also be connected by a buckle type, which is easy to open and close and has good sealing performance.

An adjusting valve 65 for adjusting the flow rate of the foaming liquid is provided on the connecting sleeve 60. The adjusting valve 65 includes a valve seat 650 provided on the connecting sleeve 60. The valve seat 650 is connected to the connecting sleeve 60 by threads. A flow limiting rod 651 is provided inside the valve seat 650. The flow limiting rod 651 is connected to the valve seat 650 by threads; The flow limiting rod 651 near one end of the connecting sleeve 60 is set to be conical, and the conical design has a guiding effect on the flow limiting rod entering the connecting sleeve.

A flow limiting knob 652 is provided at the top of the flow limiting rod. The flow limiting knob is fixed to the top of the flow limiting rod by bolts. By rotating the flow limiting knob, you can adjust the width of liquid inlet on connecting sleeve, thereby controlling amount of foaming liquid entering foaming body, thereby achieving effect of adjusting foam concentration.

Said Handle 7 is used for holding to support foam pot. When in use, you can hold handle 7 with one hand and hold handle switch of car washer with other hand, so that operation can effectively maintain stability and prevent foam pot from falling and breaking.

This invention also provides a method for using a foam pot, including providing a foam pot, which includes a foaming body 1, with a connector assembly 3, foaming and nozzle device 2, spray pot assembly 4 and foam concentration adjustment device 5 on said Foaming body 1; Said Connector assembly 3 includes a quick plug connector 33; Said Spray pot assembly 4 includes a pot body 43 and a pot lid 41; Said Foam concentration adjustment device 5 includes a fine-tuning knob 52; Said Foaming and nozzle device 2 includes a rotating sleeve 24;

Pour the foaming liquid into the pot body 43;

Screw the pot body 43 onto the pot lid 41;

Connect the foam pot to the high-pressure water gun through the quick plug connector 33;

Adjust the foam concentration by rotating the fine-tuning knob 52;

Adjust the style of foam by rotating the rotating sleeve 24, and you can start using it.

This method is convenient for adjusting the foam pot, easy to operate, and quick to get started.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the present invention, and these improvements and embellishments are also regarded as the protection scope of the present invention.

The invention has now been described in detail for the purposes of clarity and understanding. However, those skilled in the art will appreciate that certain changes and modifications may be practiced within the scope of the appended claims.

What is claimed is:

1. A foam pot, comprising:

a foaming body, said foaming body comprising a main fluid inlet and a main fluid outlet, a fluid channel being formed between said main fluid inlet and said main fluid outlet; a connector assembly is provided at said main fluid inlet; a foaming and nozzle device is provided at said main fluid outlet; a spray pot assembly and a foam concentration adjustment device for providing foaming liquid are also provided between said main fluid inlet and said main fluid outlet, said foaming and nozzle device comprising a mixing tube provided on said foaming body, said mixing tube comprising an inlet end and an outlet end, a mixing channel being provided between said inlet end and said outlet end of said mixing tube, one or more air inlets being provided at said inlet end, and a groove being provided on said mixing tube; a rotating sleeve is sleeved on said outlet end, said rotating sleeve comprising a foaming part having a cross-section smaller than a body of said rotating sleeve and provided at a front end of the rotating sleeve, and a foaming ball is provided inside said foaming part; a card hole corresponding to a position of said groove is also provided on said rotating sleeve, and a card pin extending into said groove is provided inside said card hole; a clip bracket is sleeved on said foaming part, and a clip is provided inside said clip bracket; an angle adjustment knob for adjusting an opening and closing angle of said clip is sleeved on said rotating sleeve;

wherein there is a third card slot on an outer circumference of a front end of said foaming part, and on said clip bracket, there is a circular buckle, when said clip bracket is sleeved on the front end of said foaming part, said circular buckle buckles into said third card slot.

2. The foam pot according to claim 1, wherein the main fluid outlet of said foaming body is provided with an outwardly extending conical part having a gradually decreasing cross-section, said one or more air inlets provided on said mixing tube is located within a range of said conical part, there is a gap between said conical part and said mixing channel, and gas passing through said one or more air inlets can enter said mixing channel through the gap.

3. The foam pot according to claim 1, wherein the inlet end of said mixing tube is connected to an external thread on said foaming body through an internal thread; on the outer circumference of the inlet end of said mixing tube, there is a first sealing ring groove, and a first sealing ring is provided in said first sealing ring groove, which provides a seal for a connection between said rotating sleeve and said mixing tube;

on the outer circumference of the outlet end of said mixing tube, there is a second sealing ring groove, and a second sealing ring is provided in said second sealing ring groove, which provides a seal for a connection between said foaming part and said mixing tube; a number of air inlets is four.

4. The foam pot according to claim 1, wherein on the front end of said rotating sleeve, there is a second card slot and a third sealing ring groove; on said angle adjustment knob, there is a buckle, when said angle adjustment knob is sleeved on said rotating sleeve, said buckle buckles into said second card slot; a third sealing ring is provided in said third sealing ring groove, which provides a seal for a connection between said angle adjustment knob and said rotating sleeve.

5. The foam pot according to claim 1, wherein said spray pot assembly includes a connecting sleeve connected to said foaming body, a bottom end of said connecting sleeve is connected with a pot lid, inside said connecting sleeve, there is also a connecting pipe, said connecting pipe passes through said pot lid from inside of said pot lid, clamping said pot lid between said connecting sleeve and said connecting pipe to prevent foaming liquid from leaking; a pot body is screwed onto said pot lid; at a bottom end of said connecting pipe, there is a liquid suction pipe that extends to a bottom of said pot body.

6. The foam pot according to claim 5, wherein said connecting sleeve is connected to said foaming body by threads; at the bottom end of said connecting sleeve, there is a gear-shaped protrusion to prevent said connecting sleeve and said pot lid from rotating relative to each other;

said connecting pipe is connected to said connecting sleeve by threads; inside said connecting pipe, there are coaxial and communicating first through hole and second through hole, said first through hole is close to foaming body, a cross-sectional area of said first through hole is smaller than a cross-sectional area of said second through hole; the cross-sectional area of said second through hole gradually increases from one end of said first through hole towards another end of said connecting pipe.

7. The foam pot according to claim 1, wherein said connector assembly includes a spray core provided on said foaming body, said spray core is coaxially arranged with said mixing tube, said connector assembly also includes a connector base provided at a main fluid input end, inside said connector base, there is a flow stabilizing sleeve, the front end of said flow stabilizing sleeve abuts against said spray core, at a tail end of said connector base, there is a quick plug connector; on said foaming body, there is an elastic cap that connects said connector base and said foaming body.

8. The foam pot according to claim 7, wherein a cross-section of and inner hole of the flow stabilizing sleeve near a spray core end of said flow stabilizing sleeve is larger than near a quick plug connector end.

9. The foam pot according to claim 7, wherein said spray core is connected to said foaming body by threads; said flow stabilizing sleeve is connected to said connector base by threads; said quick plug connector is connected to said connector base by threads; said elastic cap has flange inside, said elastic cap presses against said connector base through flange, said elastic cap connects to said foaming body via threads.

10. The foam pot according to claim 1, wherein said foam concentration adjustment device includes an adjusting seat body provided on said foaming body; an adjusting rod is provided inside said adjusting seat body; a fine-tuning knob is provided at a top end of said adjusting rod.

11. The foam pot according to claim 10, wherein said adjusting seat body is connected to said foaming body by threads; one or more vent holes are provided on said adjusting seat body; said adjusting rod is connected to said adjusting seat body by threads; said adjusting rod is tapered near an end close to said foaming body.

12. The foam pot according to claim 10, wherein said fine-tuning knob is fixed on said adjusting rod by bolts.

13. A foam pot, comprising:

a foaming body, said foaming body comprising a main fluid inlet and a main fluid outlet, a fluid channel being formed between said main fluid inlet and said main fluid outlet; a connector assembly is provided at said main fluid inlet; a foaming and nozzle device is provided at said main fluid outlet; a spray pot assembly and a foam concentration adjustment device for providing foaming liquid are also provided between said main fluid inlet and said main fluid outlet, said foaming and nozzle device comprising a mixing tube provided on said foaming body, said mixing tube comprising an inlet end and an outlet end, a mixing channel being provided between said inlet end and said outlet end of said mixing tube, one or more air inlets being provided at said inlet end, and a groove being provided on said mixing tube; a rotating sleeve is sleeved on said outlet end, said rotating sleeve comprising a foaming part having a cross-section smaller than a body of said rotating sleeve and provided at a front end of the rotating sleeve, and a foaming ball is provided inside said foaming part; a card hole corresponding to a position of said groove is also provided on said rotating sleeve, and a card pin extending into said groove is provided inside said card hole; a clip bracket is sleeved on said foaming part, and a clip is provided inside said clip bracket; an angle adjustment knob for adjusting an opening and closing angle of said clip is sleeved on said rotating sleeve;

wherein on the front end of said rotating sleeve, there is a second card slot and a third sealing ring groove; on said angle adjustment knob, there is a buckle, when said angle adjustment knob is sleeved on said rotating sleeve, said buckle buckles into said second card slot;

wherein a third sealing ring is provided in said third sealing ring groove, which provides a seal for a connection between said angle adjustment knob and said rotating sleeve.

14. A foam pot, comprising:

a foaming body, said foaming body comprising a main fluid inlet and a main fluid outlet, a fluid channel being formed between said main fluid inlet and said main fluid outlet; a connector assembly is provided at said main fluid inlet; a foaming and nozzle device is provided at said main fluid outlet; a spray pot assembly and a foam concentration adjustment device for providing foaming liquid are also provided between said main fluid inlet and said main fluid outlet, said foaming and nozzle device comprising a mixing tube provided on said foaming body, said mixing tube comprising an inlet end and an outlet end, a mixing channel being provided between said inlet end and said outlet end of said mixing tube, one or more air inlets being provided at said inlet end, and a groove being provided on said mixing tube; a rotating sleeve is sleeved on said outlet end, said rotating sleeve comprising a foaming part having a cross-section smaller than a body of said rotating sleeve and provided at a front end of the rotating sleeve, and a foaming ball is provided inside said foaming part; a card hole corresponding to a position of said groove is also provided on said rotating sleeve, and a card pin extending into said groove is provided inside said card hole; a clip bracket is sleeved on said foaming part, and a clip is provided inside said clip bracket; an angle adjustment knob for adjusting an opening and closing angle of said clip is sleeved on said rotating sleeve;

wherein said spray pot assembly includes a connecting sleeve connected to said foaming body, a bottom end of said connecting sleeve is connected with a pot lid, inside said connecting sleeve, there is also a connecting pipe, said connecting pipe passes through said pot lid from inside of said pot lid, clamping said pot lid between said connecting sleeve and said connecting pipe to prevent foaming liquid from leaking; a pot body is screwed onto said pot lid; at a bottom end of said connecting pipe, there is a liquid suction pipe that extends to a bottom of said pot body;

wherein said connecting sleeve is connected to said foaming body by threads; at the bottom end of said connecting sleeve, there is a gear-shaped protrusion to prevent said connecting sleeve and said pot lid from rotating relative to each other;

wherein said connecting pipe is connected to said connecting sleeve by threads; inside said connecting pipe, there are coaxial and communicating first through hole and second through hole, said first through hole is close to foaming body, a cross-sectional area of said first through hole is smaller than a cross-sectional area of said second through hole; the cross-sectional area of said second through hole gradually increases from one end of said first through hole towards another end of said connecting pipe.

* * * * *